United States Patent
Sonnenschein et al.

(10) Patent No.: US 8,625,393 B2
(45) Date of Patent: Jan. 7, 2014

(54) PORTABLE DIVER APPARATUS, COMPRISING A PORTABLE COMPUTING DEVICE AND AN ADD ON DIVER DEVICE

(75) Inventors: Elazar Sonnenschein, Omer (IL); Yuval Malka, Beer-Sheva (IL); Arie Kalo, Ness Ziona (IL)

(73) Assignee: Underwater Technologies Center Ltd., Omer (IL)

( * ) Notice: Subject to any disclaimer, the term of this patent is extended or adjusted under 35 U.S.C. 154(b) by 408 days.

(21) Appl. No.: 12/909,147

(22) Filed: Oct. 21, 2010

(65) Prior Publication Data

US 2011/0096633 A1    Apr. 28, 2011

Related U.S. Application Data

(60) Provisional application No. 61/254,701, filed on Oct. 25, 2009.

(51) Int. Cl.
*H04B 11/00* (2006.01)
(52) U.S. Cl.
CPC ..................................... *H04B 11/00* (2013.01)
USPC .......................................................... 367/131
(58) Field of Classification Search
USPC .......................................................... 367/131
See application file for complete search history.

(56) References Cited

U.S. PATENT DOCUMENTS

| | | | |
|---|---|---|---|
| 5,523,982 A * | 6/1996 | Dale | 367/131 |
| 5,956,291 A * | 9/1999 | Nehemiah et al. | 367/131 |
| 6,125,080 A | 9/2000 | Sonnenschein et al. | |
| 6,272,072 B1 | 8/2001 | Wulich et al. | |
| 6,272,073 B1 * | 8/2001 | Doucette et al. | 367/131 |
| 6,762,678 B2 * | 7/2004 | Arens | 340/506 |
| 6,807,127 B2 * | 10/2004 | McGeever, Jr. | 367/128 |
| 6,856,578 B2 * | 2/2005 | Magine et al. | 367/134 |
| 7,388,512 B1 * | 6/2008 | Moorer, Jr. | 340/850 |
| 2004/0022129 A1 * | 2/2004 | McGeever, Jr. | 367/128 |
| 2006/0286931 A1 * | 12/2006 | Rhodes et al. | 455/40 |
| 2007/0127316 A1 * | 6/2007 | Pope | 367/131 |
| 2008/0101159 A1 * | 5/2008 | Pope | 367/131 |
| 2009/0279389 A1 * | 11/2009 | Irie | 367/118 |

FOREIGN PATENT DOCUMENTS

WO    2007/148318    12/2007

* cited by examiner

*Primary Examiner* — Isam Alsomiri
*Assistant Examiner* — James Hulka
(74) *Attorney, Agent, or Firm* — Roach Brown McCarthy & Gruber, P.C.; Kevin D. McCarthy

(57) ABSTRACT

A portable diving apparatus, which comprises: (a) a water proof casing which comprises an external key pad; (b) a portable computing device within said water proof casing, said portable computing device comprises a diving module; (c) a pressure sensor which is mounted at least partially outside said water proof casing; (d) an adaptor within said water proof casing for receiving key pad entries from said key pad by means of first cable, and pressure indications from said pressure sensor by means of third cable, and for converting said key pad entries and said pressure indications to key pad data and pressure data respectively in a standard communication protocol, and transferring said data in said (wired or wireless) standard communication protocol into said portable computing device, wherein at least said pressure indications are processed by said diving module of said portable computing device and displayed as diver information on a display of said portable computing device.

11 Claims, 4 Drawing Sheets

PORTABLE DIVER APPARATUS, COMPRISING A PORTABLE COMPUTING DEVICE AND AN ADD ON DIVER DEVICE

REFERENCE TO CO-PENDING APPLICATIONS

Priority is claimed to U.S. provisional patent application No. 61/254,701, filed on Oct. 25, 2009.

FIELD OF THE INVENTION

The field of the invention relates to underwater accessories for divers. More specifically, the invention relates to a portable diver apparatus, which comprises in combination a portable computing device such as a cellular phone, smart phone, music or movie player, etc., an add-on diver device which comprises at least one sensor and/or an add-on acoustic modem, and a water proof cover.

BACKGROUND OF THE INVENTION

Varieties of electronic diver devices that are used for assisting divers underwater are well known in the art. Such devices, among others, include:

a. a diver computer which typically comprises at least one sensor, a computing component, and a display. Said sensor may be, for example, a pressure sensor which measures the underwater pressure. The diver computer uses an algorithm to convert the measured pressure to depth, which follows by calculation of the diving time at each depth. Some of the algorithm may also include calculation for the available amount of gas mixture, etc. To summarize, a diver computer, for example, measures, computes, and displays to the diver information during the diving, such as the depth, the amount of breathing gas available, the Nitrogen estimated level of the diver, or other gas mixture, etc.

b. a diver communication device which comprises an ultrasonic transceiver, a micro-controller or the like, and a display, which is used for communicating messages between divers. Such a diver communication device enables the diver to select a textual message from messages storage, to select a destination device and to transmit the selected message to the destination device is disclosed, for example, in U.S. Pat. No. 6,125,080.

c. A diver location device, which uses a Doppler frequency shift in order to enable detection of a diver (for example, in a case of distress situation). Such a device is disclosed, for example, in U.S. Pat. No. 6,272,072. In some cases, said device of U.S. Pat. No. 6,272,072 is combined with the device of U.S. Pat. No. 6,125,080, forming a combined messaging device having location capabilities. Such a combined device (called UDI) is distributed by Underwater Technology Center Ltd. (UTC)—http://www.utc-digital.com.

d. Still another diver device, which combines a diver communication device, a diver computer, and a camera, is disclosed in WO2007/148318.

All the abovementioned diver devices include some type of a processing unit, at least one sensor and/or acoustic antenna which is in contact with the water, a display, and a waterproof casing. Hereinafter, for the sake of convenience, both sensor and the antenna will be referred to by the term "sensor", although a receiving/transmitting antenna is not typically referred to as sensor. The inclusion of such computing, displaying, and transmit and receive capabilities within a waterproof diver device is relatively complicated and expensive, as such a device in its entirety is a stand alone device which can be used by the user only underwater and the number of units that can be sold is rather limited to those who are in the field of diving. Therefore, each device can include relatively limited capabilities. For example, due to cost considerations, the display of such a device is typically supplied with a relatively low resolution. Furthermore, the processing capabilities of such devices are relatively limited for the same reasons. Furthermore, the development of dedicated software applications for such devices is also relatively expensive.

On the other hand, the fast development in the last decade of land portable computing devices, such as cellular phones, music players, note books, smart phones, pocket PC, Palm, Internet browsing devices and the like is astonishing. For example, the computing and display capabilities of the Apple's I-Phone, Microsoft Zune, HTC smart phones and the like are astonishing. The inclusion of such high performance and variety of capabilities within diver devices, while still maintaining their price reasonable, is not seen in the near future in view of the development high cost on one hand, and in view of the limited market on the other hand. It should be noted that throughout this application, when reference is made to a cellular phone in the context of the present invention, this is done for the sake of convenience, as any other from the abovementioned portable computing devices can be used.

In another aspect, recently water proof casings for cellular phones, for example, of the I-Phone type, have recently become available in the market (for example a casing model DIVE300 manufactured by $H_2O$ Audio Inc.—http://www.h2oaudio.com/waterproof_dive.php). This waterproof casing is made of a rigid, at least partially transparent plastic, which can open for enabling insertion into it of the cellular phone, and closure such that the cellular phone can be taken underwater. This water proof casing also includes external buttons that enable activation of at least several of the cellular phone functions from outside of the casing (i.e., from within the water). The use of such buttons therefore enables activation, while in the water, said at least a portion of the cellular phone functions. In such a manner, and while using such water proof casing, three important applications of the cellular phone that can typically be activated from within the water are the camera, a music player (while using a special earphones) and a game player. However, none of the functions that typically characterize said dedicated diver devices (for example, measurement of the amount of available breathing gas, transmit and receipt of messages underwater, location capabilities, etc.) can yet be performed underwater by said combination of cellular phone and water proof casing.

It is therefore an object of the present invention to significantly enhance the performance of typical diver devices, while maintaining their price reasonable, or even significantly lower than their present price.

It is another object of the invention to enable enhancement of the capabilities of conventional portable computing devices to also include underwater capabilities that are presently performed only by typical diver devices.

It is still another object of the invention to enable said enhancement in a manner that provides overall enhanced capabilities in comparison with typical diver devices, in a reduced overall costs, particularly to those that already possess a portable computing device.

It is still an object of the invention to provide several embodiments that enable various levels of functionalities.

It is still an object of the present invention to enable easy upgrades and maintenance of the apparatuses of the invention, in compare to typical diver devices.

Other objects and advantages of the invention will become apparent as the description proceeds.

SUMMARY OF THE INVENTION

A portable diving apparatus, which comprises: (a) a water proof casing which comprises an external key pad; (b) a portable computing device within said water proof casing, said portable computing device comprises a diving module; (c) a pressure sensor which is mounted at least partially outside said water proof casing; (d) an adaptor within said water proof casing for receiving key pad entries from said key pad by means of first cable, and pressure indications from said pressure sensor by means of third cable, and for converting said key pad entries and said pressure indications to key pad data and pressure data respectively in a standard communication protocol, and transferring said data in said (wired or wireless) standard communication protocol into said portable computing device, wherein at least said pressure indications are processed by said diving module of said portable computing device and displayed as diver information on a display of said portable computing device. The term "standard communication protocol" refers herein to a communication protocol (wired or wireless) by which a portable computing device commonly communicates with other or same type of devices located in close range.

In an embodiment of the invention, said data in standard communication protocol is conveyed to said portable computing device by means of a second cable and a standard communication connector at said portable computing device.

In an embodiment of the invention, said data in standard communication protocol is conveyed to said portable computing device wirelessly.

In an embodiment of the invention, the water proof casing is at least partially transparent.

In an embodiment of the invention, the portable diving apparatus further comprises: (a) an acoustic antenna which is mounted at least partially outside said water proof casing, for receiving and transmitting acoustic signals, said acoustic antenna is connected with an acoustic modem by means of fourth cable; (b) acoustic modem within said water proof casing, which is connected with said adaptor by means of a fifth cable, said acoustic modem exchanges data with said portable computing device via said adaptor, which in turn communicates with said portable computing device in said standard communication protocol; (c) wherein said diving module within said portable computing device further handles the communication messages that are communicated by the portable diving apparatus, and interfaces with the user with respect to communication information via said display of said portable computing device.

In an embodiment of the invention, The portable diver apparatus is further used as a diver location device, wherein said communication messages are used for said location purpose, and wherein said diving module within said portable computing device further handles the task of location, using the display of said portable computing device.

In an embodiment of the invention, a standard wireless capability of said portable computing device is used above water for the purpose of setting up parameters and data within said diving apparatus, for downloading accumulated diving data from said portable computing device to a server or another apparatus, and for maintenance purposes.

In an embodiment of the invention, the setting up of parameters comprises: (a) parameters relating to the operation of the apparatus as a diver computer; (b) parameters relating to the apparatus as a diver communication device, comprising pre-defined messages, and definition of the apparatus in an underwater network of similar devices; and (c) parameters relating to the operation of the apparatus as a diver location device.

DETAILED DESCRIPTION OF PREFERRED EMBODIMENTS

Figure 1:
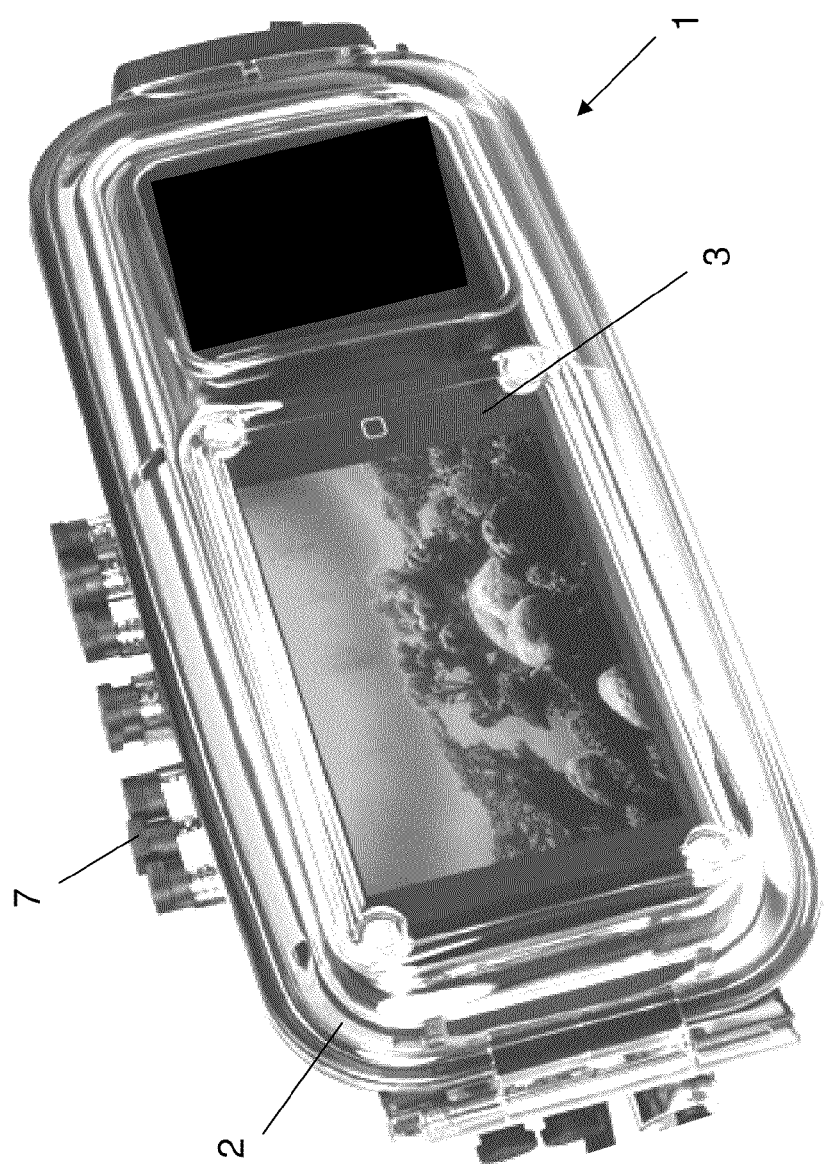
FIG. 1 shows an apparatus 1 which comprises a portable computing device according to the prior art.

FIG. 1 shows an apparatus 1, for operating a cellular device in water activities, which comprises a portable computing device, in this case Apple I-Phone 3G, which is placed within a water proof casing 2 such as the DIVE300 manufactured by H$_2$O Audio Inc. This casing 2 enables a user to activate underwater several of the functions of the I-Phone, by means of plurality of push buttons 7. For example, the user may activate the camera which is a part of I-Phone 3G, in order to capture photographs underwater. It should be noted that the configuration of FIG. 1 enables underwater performance of conventional features that are already included within the typical cellular phone, and that are typically designed to be performed above the water. For example, although the apparatus 1 is intended to be used underwater while being placed within casing 1, it cannot perform typical features that characterize diver devices, as elaborated hereinabove. For example, apparatus 1 cannot measure the depth of diving, cannot transmit or receive messages to other devices while being underwater, and cannot locate other such devices located underwater. The present invention, depending on its various embodiments, combines within apparatus 1 at least a portion of said missing functionalities, by the inclusion of an add-on, low cost and simple device.

Figure 2:
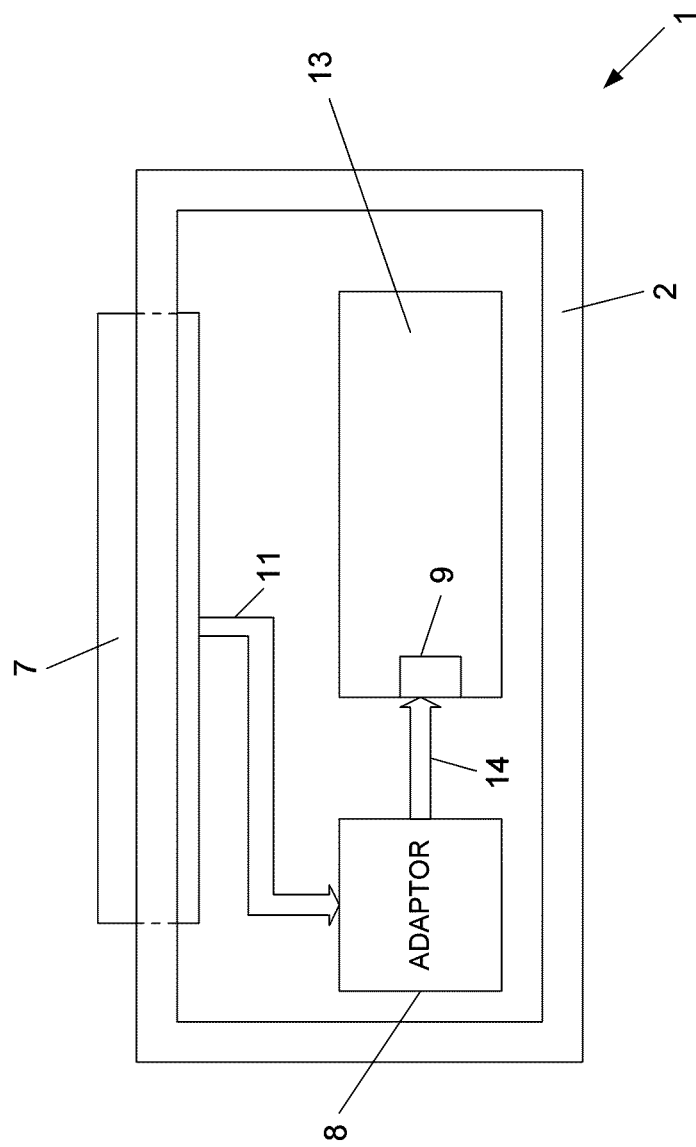
FIG. 2 is a block diagram illustrating the general structure of prior art apparatus 1.

FIG. 2 is a block diagram illustrating the general structure of prior art apparatus 1. Portable computing device 13 is placed within the water proof casing 2. The water proof casing 2 comprises an external key pad 7, for operating from the outside of casing 2 the portable computing device 13. The key pad 7 is connected to adaptor 8 by means of first cable 11. Adaptor 8 converts the keypad entries into a key pad data in a standard protocol. The key pad data is conveyed into the portable computing device 13 by means of second cable 14 and standard communication connector 9. Such standard communication connector may be, for example, a USB connector, although less preferably, the connection may also be wireless (such as Bluetooth or Wi Fi). Moreover, adaptor 8 may receive its power supply from the portable computing device 13 by means of second cable 14.

Figure 3:
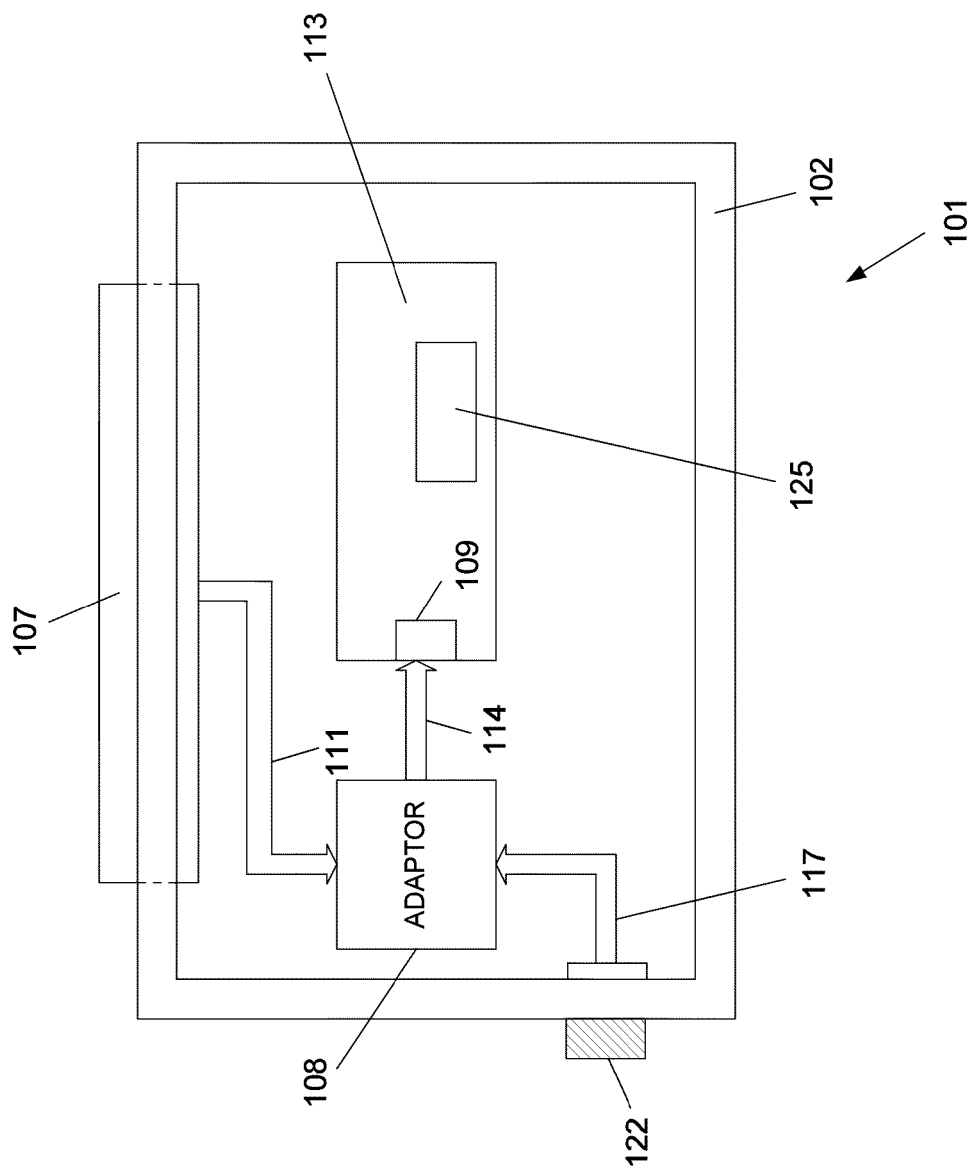
FIG. 3 is a block diagram illustrating a general structure of the diver apparatus according to a first embodiment of the present invention.

FIG. 3 is a block diagram illustrating a general structure of apparatus 101, according to a first embodiment of the present invention. Portable computing device 113 is placed within the water proof casing 102. The water proof casing 102 comprises an external key pad 107, for operating from the outside of casing 102 the portable computing device 113. The key pad 107 is connected to adaptor 108 by means of first cable 111. In addition, apparatus 102 comprises a pressure sensor 122, which senses the water pressure outside of the casing. Pressure indications from sensor 122 are conveyed by means of third cable 117 into Adaptor 108. Power supply into pressure sensor 122 may be also conveyed by means of cable 117. Adaptor 108 converts the keypad entries, and the pressure indications as received by means of first cable 111 and third cable 117 respectively into key pad data and pressure data in a standard communication protocol (wired such as USB, or wireless such as WiFI, Bluetooth, etc.). Said key pad data and pressure data are conveyed into the portable computing device 113 by means of second cable 114 and standard communication connector 109. Again, such standard communication connector may be, for example, a USB connector, although less preferably, the connection may also be wireless (such as Bluetooth). Again, adaptor 108 may receive its power supply from the portable computing device 113 by means of second cable 114.

In addition, portable computing device 113 comprises a diving module 125. Said module is essentially the software which is typically included within a conventional dive computer. Upon receipt of said pressure data, said diving module 125 processes this data and displays corresponding diving information to the diver on the standard display of portable computing device 113. Module 125 is controlled by the diver in a similar manner to the other conventional software modules of portable computing device 113

Figure 4:
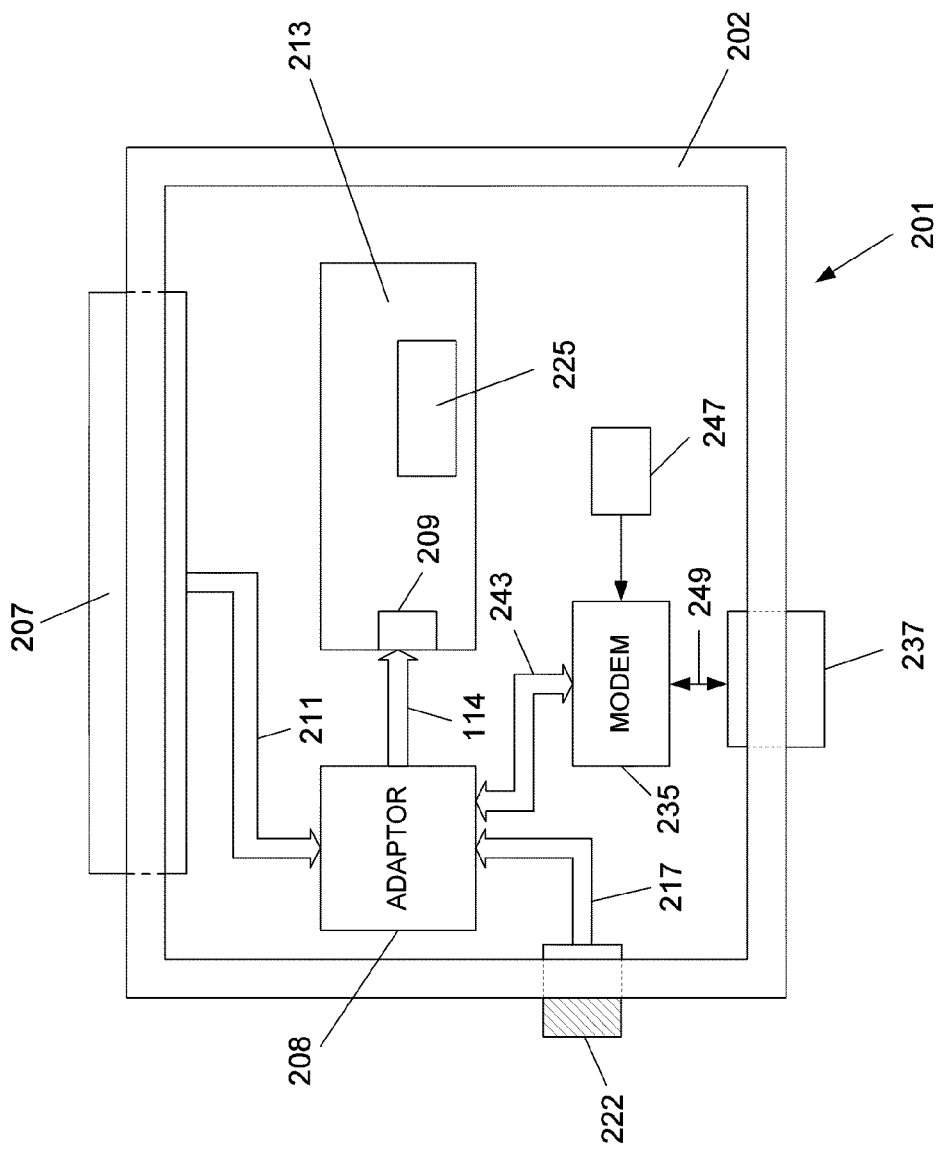
FIG. 4 is a block diagram illustrating a general structure of a diver apparatus, according to a second embodiment of the present invention.

FIG. 4 is a block diagram illustrating a general structure of apparatus 201, according to a second embodiment of the present invention. Portable computing device 213 is placed within the water proof casing 202. The water proof casing 202 comprises an external key pad 207, for operating from the outside of casing 202 the portable computing device 213. The key pad 207 is connected to adaptor 208 by means of first cable 211. In addition, apparatus 202 comprises a pressure sensor 222, which senses the water pressure outside of the casing. Pressure indications from sensor 222 are conveyed by means of third cable 217 into Adaptor 208. Power supply into pressure sensor 222 may be also conveyed by means of cable 217. In addition, Apparatus 201 comprises an acoustic modem 135 which is connected to acoustic antenna (hydrophone) 237 by means of fourth cable 249. Acoustic modem 235 transfers communication data to adaptor 208 by means of fifth cable 243. Adaptor 208 converts the keypad entries, the pressure indications, and the communication information, as received by means of first cable 211, third cable 217, and fifth cable 243 respectively, into key pad data, pressure data, and communication data in a standard communication protocol. Said key pad data, pressure data, and communication data, are conveyed into the portable computing device 213 by means of second cable 214 and standard communication connector 209. Again, such standard communication connector may be, for example, a USB connector, although less preferably, the connection may also be wireless (such as Bluetooth). Adaptor 208 may receive its power supply from the portable computing device 213 by means of second cable 214. Acoustic modem 235 receives its power supply from battery pack 247.

In addition, portable computing device 213 comprises a diving module 225. Said diving module comprises essentially the software which is typically included within a conventional dive computer, and the software which is typically included within a conventional diver communication device and/or a diver location device. Upon receipt of said pressure data, and communication data, said diving module 225 processes these data and displays the corresponding information to the diver on the standard display (not shown) of portable computing device 213. Module 225 is controlled by the diver in a similar manner to the other conventional software modules of portable computing device 213.

Therefore the apparatus 201 comprises all the functions of a typical diver computer, all the functions of a diver communication device, and all the functions of a typical diver location device of the prior art. For example, the diver can select and send predefined messages, he can receive such messages from another similar apparatus 201, and he can send emergency signals, enabling other apparatuses 201 to locate him, and he can view information regarding his diving.

It should also be noted that typical portable computing devices comprise various ways of outside communications, such as cellular, WiFi, Bluetooth, USB, etc. that enable easy communication with the diving module 225, for example, for configuring the diver computer, downloading diver data, configuration of a network made of plurality of the dive apparatuses of the invention, configuration of diver messages, managing diving logs, maintenance purposes, etc. Said diving features that are provided within the apparatus of the invention come in additional to those that are included anyhow in the portable computing device such as GPS, camera, games music player, etc. To summarize, the standard communication means typically exist within any modern portable computing device is now also used to serve the purposes of the "unified" diver apparatus of the invention. This is still another advantage.

As shown, the apparatuses of 101 and 201 of the present invention use the portable computing device as a platform for performing many of the functions that are generally included within prior art dedicated devices for divers, such as diver device, diver communication device, diver location device, etc. This platform also provides a very high resolution display and interface, and it serves as a dual purpose device (above and underwater respectively). The additional units (i.e., add-on devices) that enable "conversion" of the portable computing device to an underwater diver apparatus are very simple in structure, and of very low cost relative to the conventional dedicated diver devices. Therefore, the "unified" diver apparatus is much simpler in costs and structure than two separate devices (i.e., a portable computing device plus a diver device of any type, such as a diver computer, a diver communication device, a diver location device, a diver camera, etc.).

While some embodiments of the invention have been described by way of illustration, it will be apparent that the invention can be carried into practice with many modifications, variations and adaptations, and with the use of the numerous equivalents or alternative solutions that are within the scope of persons skilled in the art, without departing from the spirit of the invention or exceeding the scope of the claims.

The invention claimed is:

1. A portable diving system, which comprises:
   a) a water proof casing which is openable to contain a not water proof smart phone in its entirety, said smart phone being designed for a normal operation outside water, said water proof casing including at least a portion of a wall which is transparent to enable view from outside of the casing of a display which is an integral part of said smart phone, said water proof casing further comprises an external key pad on its external surface which is separated from the keyboard which is an integral part of said smart phone;
   b) said smart phone within said water proof casing which comprises a software diving module;
   c) a pressure sensor which is mounted at least partially outside said water proof casing;
   d) an adaptor within said water proof casing which is external of a casing of said smart phone for receiving key pad entries from said external key pad, and pressure indications from said pressure sensor, and for converting said key pad entries and said pressure indications to key pad data and pressure data respectively in a communication protocol, and transferring said pressure data in said communication protocol into said smart phone, wherein at least said pressure indications are processed by said software diving module of said smart phone and displayed as diver information on said integral display of said smart phone.

2. The portable diving system according to claim 1, wherein said data in standard communication protocol is conveyed from said adaptor to said smart phone by means of a communication connector at said smart phone.

3. The portable diving system according to claim 2 wherein said communication protocol is a USB protocol, and wherein said communication connector is a USB connector of said smart phone.

4. The portable diving system according to claim 1, wherein said data in communication protocol is conveyed from said adaptor to said smart phone wirelessly.

5. The portable diving system according to claim 4 wherein said wireless communication protocol is a Bluetooth protocol.

6. The portable diving system according to claim 1, which further comprises:
 a) an acoustic antenna which is mounted at least partially outside said water proof casing, for receiving and transmitting acoustic signals, said acoustic antenna is connected with an acoustic modem;
 b) acoustic modem within said water proof casing and external of the casing of said smart phone, which is connected with said adaptor, said acoustic modem exchanges data with said smart phone via said adaptor, which in turn communicates with said smart phone in said communication protocol;
 wherein said diving module within said smart phone further handles the communication messages that are communicated by the smart phone, and interfaces with the user with respect to communication information via said display of said smart phone.

7. The portable diving system according to claim 6, which is further used as a diver location device, wherein said communication messages are used for said location purpose, and wherein said diving module within said smart phone further handles a task of location, using the display of said smart phone.

8. The portable diving system according to claim 1, wherein a wireless capability of said smart phone is used above water and outside of the water proof casing for the purpose of setting up parameters and data within said diving apparatus, for downloading accumulated diving data from said portable computing device to a server or another apparatus, and for maintenance purposes.

9. The portable diving system according to claim 8, wherein the setting up of parameters comprises:
 a) parameters relating to the operation of the apparatus as a diver computer;
 b) parameters relating to the apparatus as a diver communication device, comprising predefined messages, and definition of the apparatus in an underwater network of similar devices; and
 c) parameters relating to the operation of the apparatus as a diver location device.

10. A portable diving system, which comprises:
 a) a water proof casing which is openable to contain a not water proof smart phone in its entirety, said smart phone being designed for a normal operation outside water, said water proof casing including at least a portion of a wall which is transparent to enable view from outside of the casing of a display which is an integral part of said smart phone;
 b) said smart phone within said water proof casing which comprises a software diving module;
 c) a pressure sensor which is mounted at least partially outside said water proof casing;
 d) an adaptor within said water proof casing which is external of a casing of said smart phone for receiving pressure indications from said pressure sensor, and for converting said pressure indications to pressure data in a communication protocol, and transferring said pressure data in said communication protocol into said smart phone, wherein at least said pressure indications are processed by said software diving module of said smart phone and displayed as diver information on said integral display of said smart phone.

11. The portable diving system according to claim 10 wherein said water proof casing further comprises an external key pad on its external surface, wherein said adaptor receives key pad entries from said external key pad, and pressure indications from said pressure sensor, and converts said key pad entries and said pressure indications to key pad data and pressure data respectively in a communication protocol, and if further transfers said pressure data in said communication protocol into said smart phone, wherein at least said pressure indications are processed by said software diving module of said portable computing device smart phone and displayed as diver information on said integral display of said smart phone.

* * * * *